(12) United States Patent
Kim

(10) Patent No.: US 8,387,308 B2
(45) Date of Patent: Mar. 5, 2013

(54) SEPARATELY WASHABLE RICE GERMINATION APPARATUS

(76) Inventor: Seong Hyeon Kim, Daegu (KR)

( * ) Notice: Subject to any disclaimer, the term of this patent is extended or adjusted under 35 U.S.C. 154(b) by 224 days.

(21) Appl. No.: 12/738,075

(22) PCT Filed: Dec. 4, 2008

(86) PCT No.: PCT/KR2008/007168
§ 371 (c)(1),
(2), (4) Date: Apr. 14, 2010

(87) PCT Pub. No.: WO2009/072822
PCT Pub. Date: Jun. 11, 2009

(65) Prior Publication Data
US 2010/0223844 A1    Sep. 9, 2010

(30) Foreign Application Priority Data

Dec. 7, 2007    (KR) .................... 20-2007-0019715 U
May 22, 2008   (KR) ........................ 10-2008-0047383

(51) Int. Cl.
*A01G 31/00*    (2006.01)
(52) U.S. Cl. .......................................................... 47/61
(58) Field of Classification Search ............... 47/60, 61, 47/65.5; *A01G 31/00*
See application file for complete search history.

(56) References Cited

FOREIGN PATENT DOCUMENTS

| KR | 10-2000-0012165 | 3/2000 |
| KR | 20-0244219 | 12/2001 |
| KR | 10-2004-0036698 | 4/2004 |
| KR | 10-2005-0090055 | 9/2005 |
| WO | 99-60274 | 11/1999 |

OTHER PUBLICATIONS

International Search Report for PCT/KR2008/007168 mailed Feb. 12, 2009.

*Primary Examiner* — Monica Williams
(74) *Attorney, Agent, or Firm* — Christopher Paul Mitchell

(57) ABSTRACT

The present invention relates to a separately washable rice germination apparatus which has a motor as a power source enabling the continuous circulation of circulating water for supplying moisture needed to germinate rice germs and an impeller rotated by the rotation of the motor, the motor and the impeller being detachably coupled to each other by means of a magnet force, such that scales or foreign substances accumulated in a water tank and the impeller during rice germination can be easily removed therefrom, and that separates a section where circulating water is sucked from a section where the sucked circulating water is pushed upwardly to a germination container, such that the circulation efficiency of the circulating water can be improved.

6 Claims, 5 Drawing Sheets

[Fig. 1]
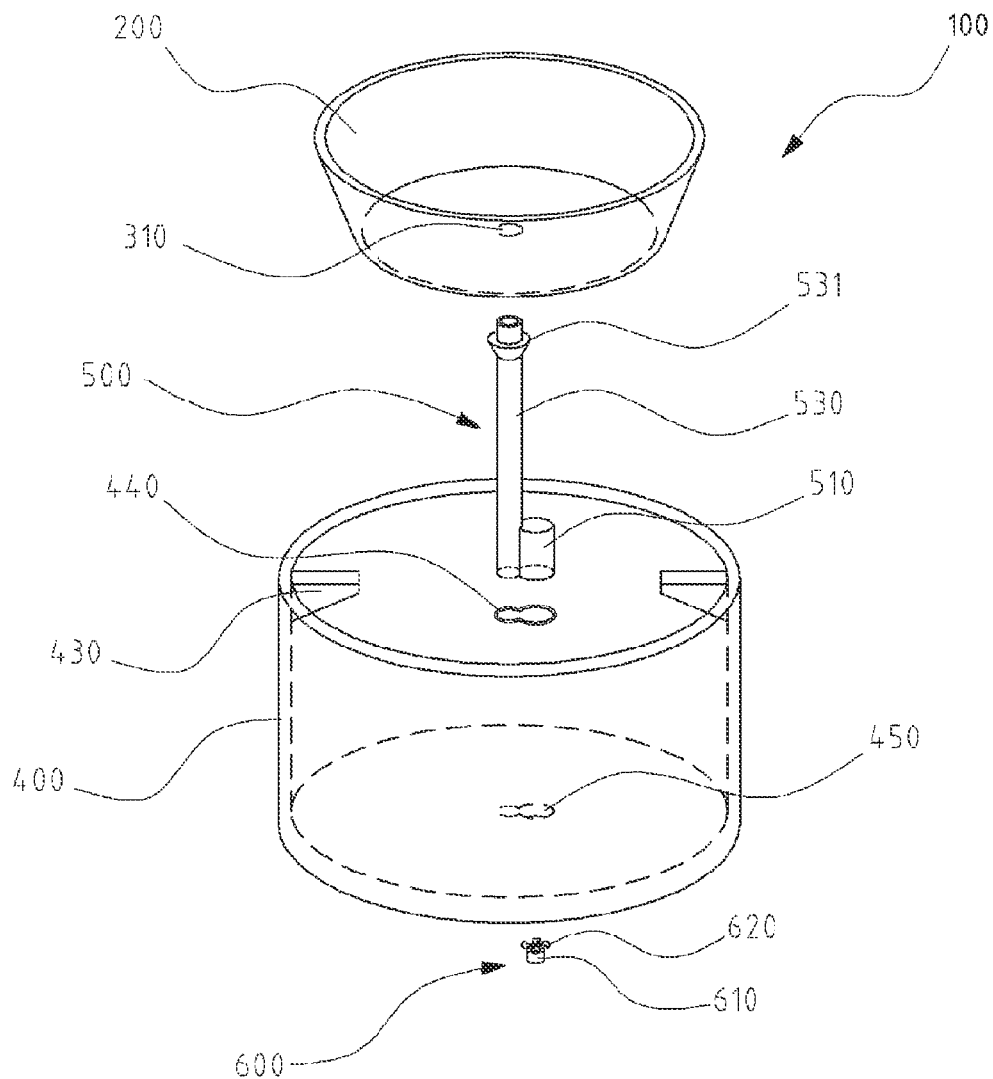
[Fig. 2]
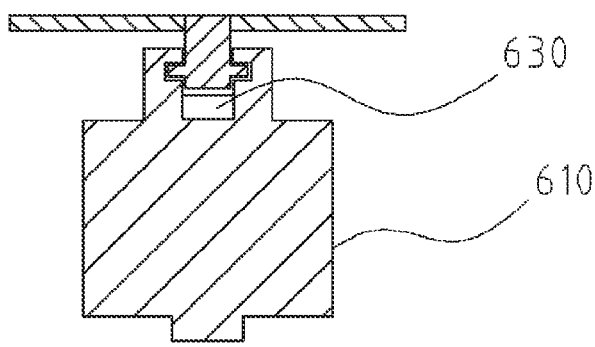

[Fig. 3]
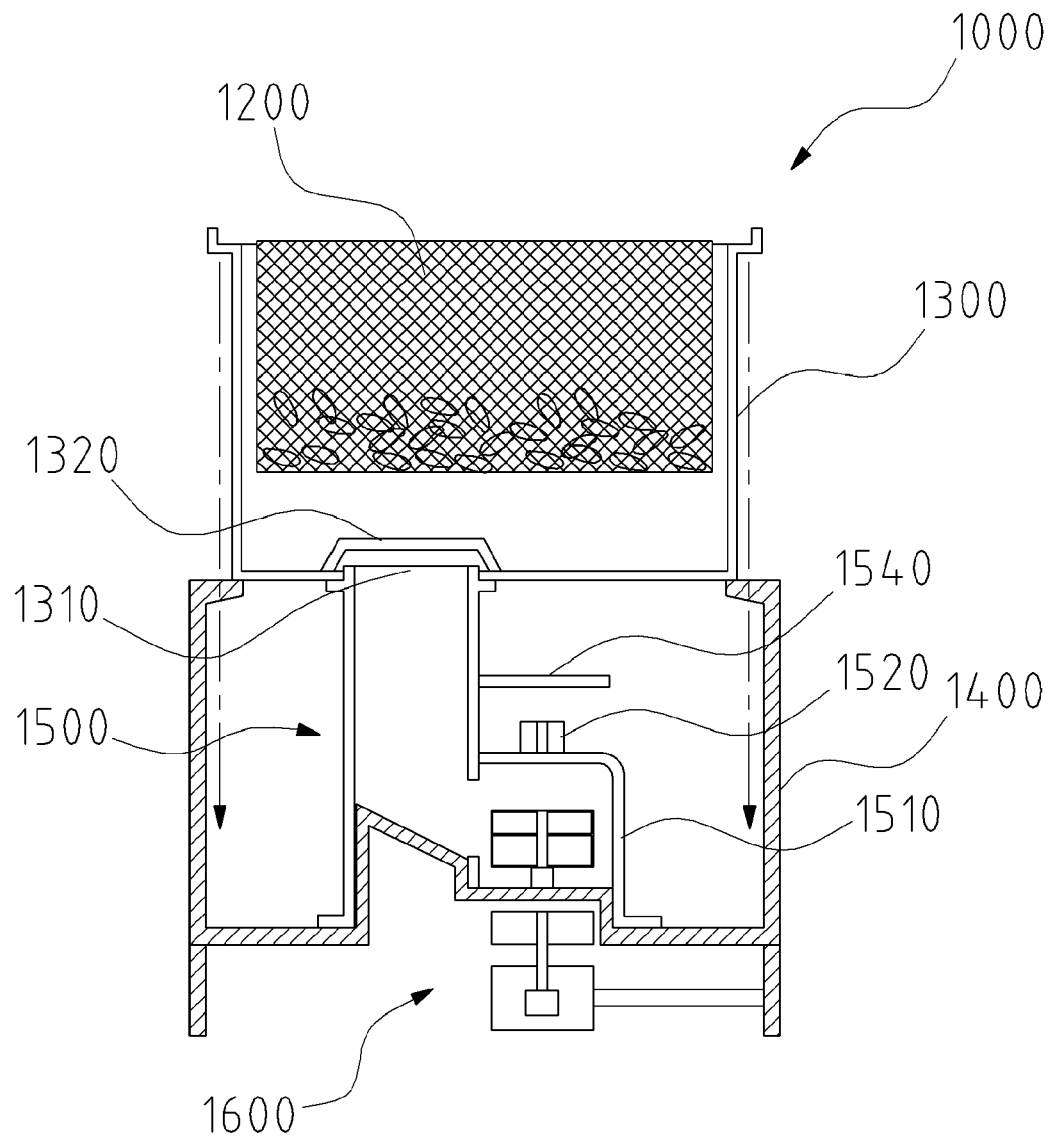

[Fig. 4]
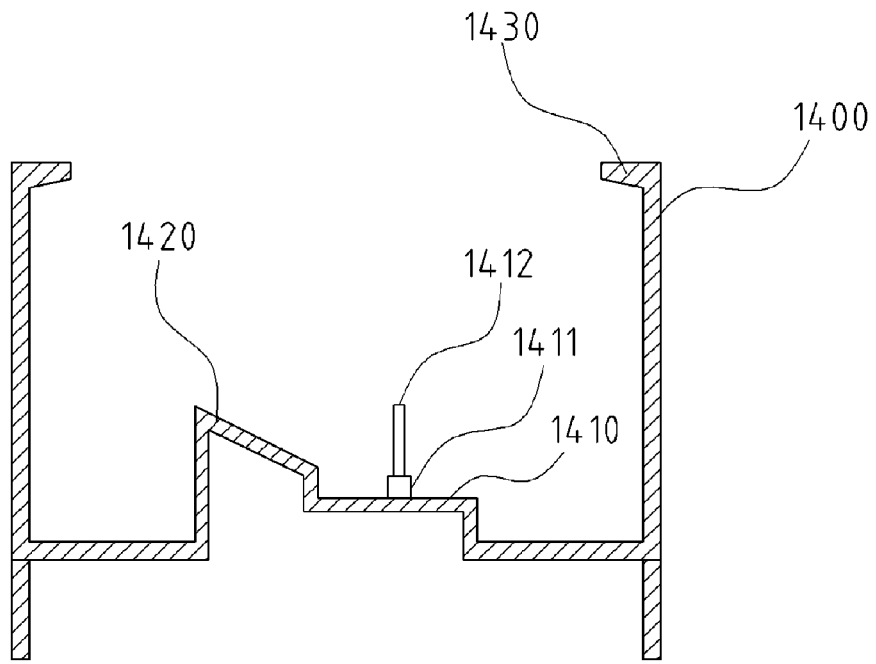
[Fig. 5]
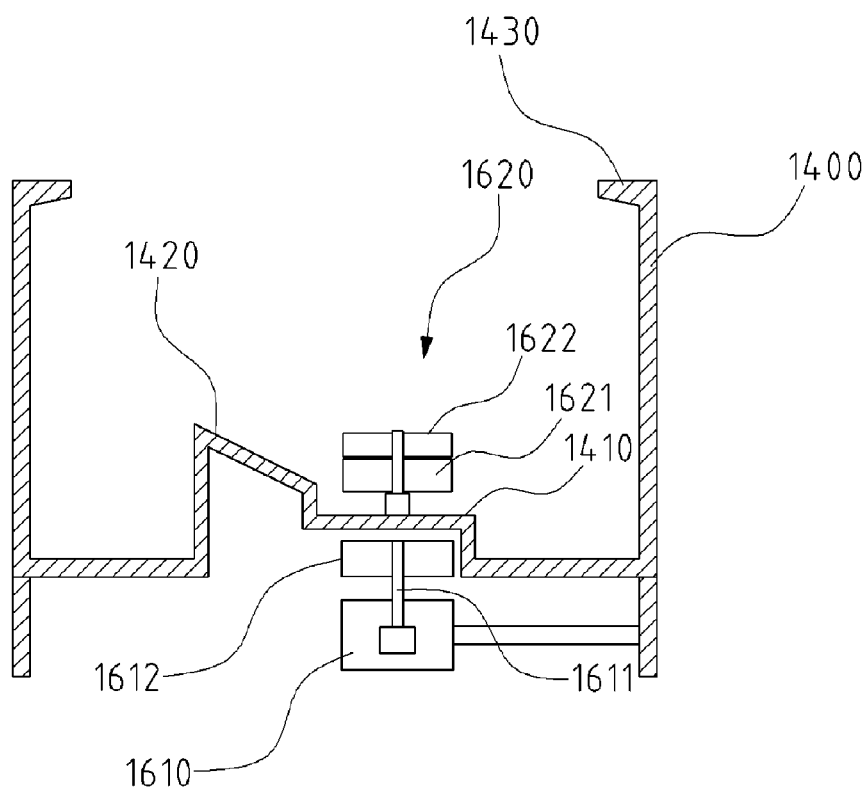

[Fig. 6]
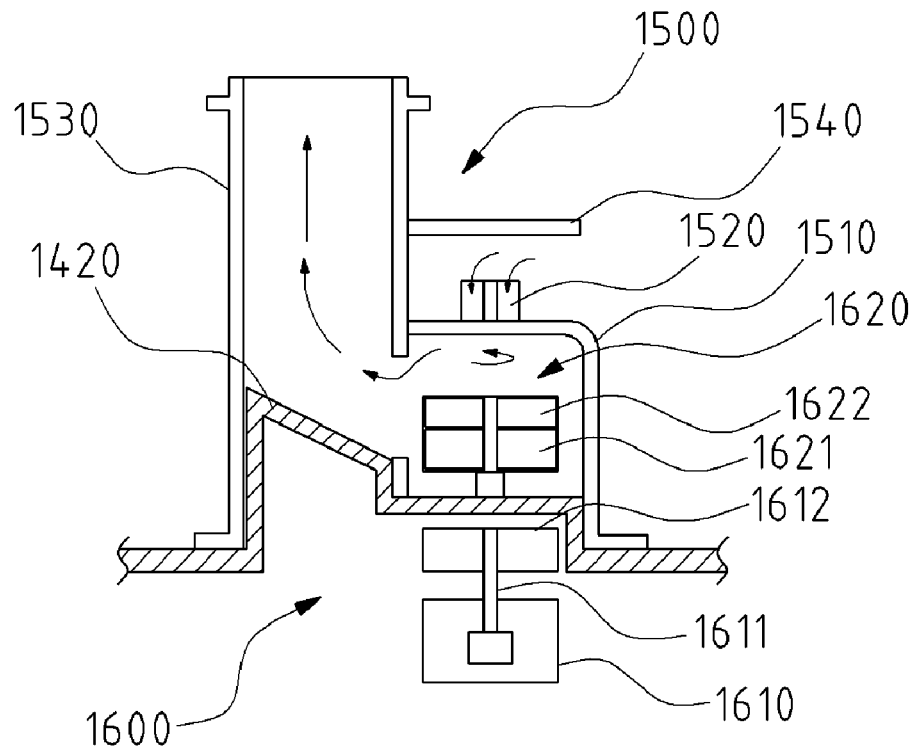
[Fig. 7]
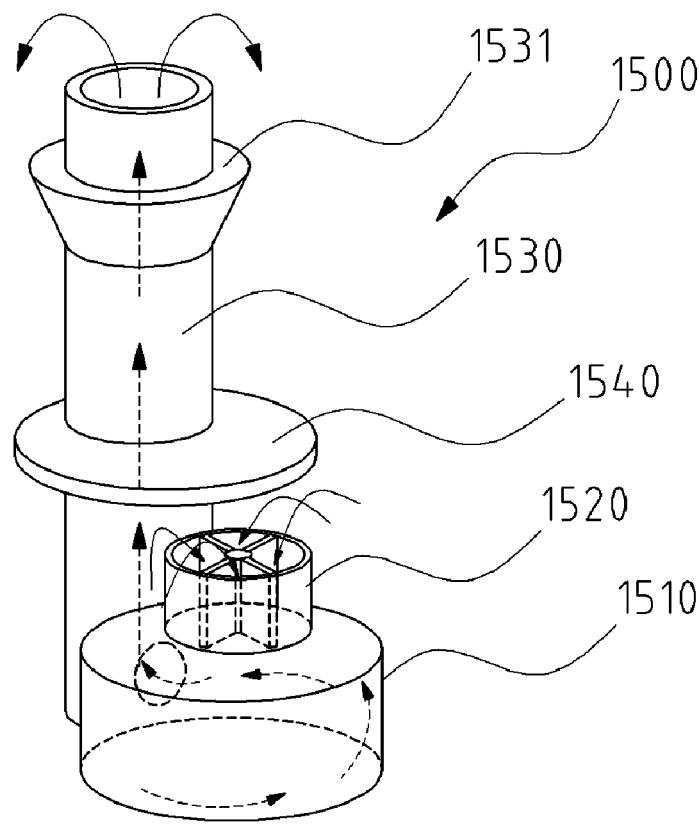

[Fig. 8]
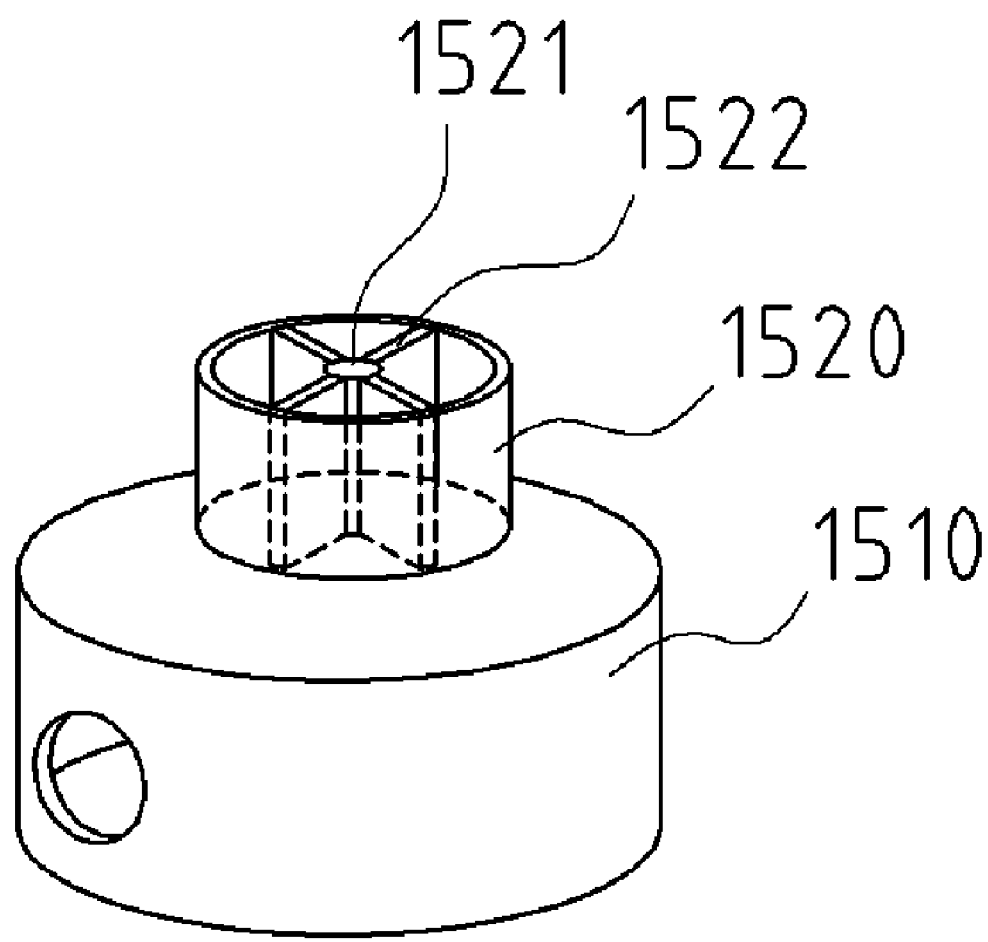

_US 8,387,308 B2_

SEPARATELY WASHABLE RICE GERMINATION APPARATUS

RELATED APPLICATIONS

This application is a 371 application of International Application No. PCT/KR2008/007168, filed Dec. 4, 2008, which in turn claims priority from Korean Patent Application Nos. 10-2008-0047383, filed May 22, 2008, and 20-2007-0019715, filed Dec. 7, 2007, all of which are incorporated herein by reference in their entireties.

TECHNICAL FIELD

The present invention relates to a separately washable rice germination apparatus, and more particularly, to a separately washable rice germination apparatus which has a motor as a power source enabling the continuous circulation of circulating water for supplying moisture needed to germinate rice germs and an impeller rotated by the rotation of the motor, the motor and the impeller being detachably coupled to each other by means of a magnet force, such that scales or foreign substances accumulated in a water tank and the impeller during rice germination can be easily removed therefrom, and that separates a section where circulating water is sucked from a section where the sucked circulating water is pushed upwardly to a germination container, such that the circulation efficiency of the circulating water can be improved.

BACKGROUND ART

Recently, as the interest in good health is increasingly high, a various kinds of rice as the chief food is introduced and put on the market. In case of the germinated brown rice obtained by removing hulls of rice kernels, the boiled brown rice becomes not soft, thereby making users feel uncomfortable to eat. Thus, the present applicant originally proposed a domestic rice germination apparatus which has been registered as Korean Patent No. 675405 wherein the apparatus hulls the brown rice until the rice germs are left, and then germinates the rice germs so as to allow the boiled rice to be soft and taste good.

The conventional rice germination apparatus generally includes a germination container for storing rice to be germinated therein, a water tank for storing circulating water to be supplied to the germination container therein, a water pipe for feeding the circulating water filled in the water tank to the germination container, and a power unit for allowing the circulating water to be circulated while being supplied to the water tank through the water pipe.

In this case, the water tank includes an upper water tank adapted to supply moisture directly to the germination container and a lower water tank disposed under the upper water tank for storing the circulating water supplied to the upper water tank again.

Further, the power unit includes a motor adapted to provide a power source allowing the circulating water to be supplied to the upper water tank and an impeller rotatably coupled to the motor so as to supply the circulating water upwardly. The water pipe is coupled to the upper portion of the impeller so as to feed the water sucked by the rotary force of the impeller to the upper water tank. In this case, the motor disposed on the outside of the underside of the lower water tank, the impeller disposed on the inner bottom surface of the lower water tank and having a rotary shaft rotated by the power of the motor, and an impeller cap adapted to cover the top portion of the impeller, are generally configured to be a single unitary body.

That is, the impeller is coupled to the motor, and the motor body and the impeller cap are screw-coupled to each other in a rigid manner.

As a result, the water stored in the lower water tank is continuously circulated to supply moisture for the purpose of the rice germination, but since the water is circulated in the limited water tank, scales are accumulated on the water pipe and the vane portion of the impeller after the long term use. Furthermore, pollutants or residues generated during the decay or oxidization of the nutrients adhered to the outer surface of the brown rice causes the inside of the water pipe and the impeller vanes to be contaminated. In other words, according to the conventional domestic rice germination apparatus, a plurality of multi-layered cases are disassembled to each other so as to clean the inside of the water tank, the inside of the germination container, and the outside of the water pipe. However, the water pipe and the impeller coupled rigidly to each other for gentle water circulation cannot be easily washed, such that it is hard to provide sanitary conditions for the rice germination.

According to the conventional domestic rice germination apparatus, furthermore, the impeller and the motor are disposed on the inside and the outside of the lower water tank so as to provide the power for circulating water, and the linear type water pipe is disposed vertically on the impeller and the motor, such that they are problematically contaminated easily by the foreign substances of the outer shell of the rice generated during the rice germination. In other words, the foreign substances generated from the rice are sucked together with water and supplied upwardly over the impeller vanes, such that the rotation of the impeller becomes weak. If the foreign substances are large in size, they fall down due to their own weight and gravity and are adhered to the impeller vanes, thereby causing the impeller to be contaminated.

Especially, according to the conventional rice germination apparatus, the lower water tank continuously storing the circulating water typically has a through-hole formed on the bottom surface thereof for coupling to the power unit, but the circulating water stored in the lower water tank problematically leaks through the through-hole formed on the bottom surface of the lower water tank.

In order to prevent the leakage of the circulating water from the lower water tank, a rubber packing member is used to block the through-hole formed on the bottom surface of the lower water tank, but in this case, it is difficult to separate the impeller, the motor and the impeller cap that are coupled rigidly to each other so as to prevent the circulating water from leaking through the through-hole of the lower water tank, which makes it hard to wash the lower water tank, the impeller vanes, the impeller cap, and the inside of the water pipe. Thus, the foreign substances generated from the rice and the scales are accumulated on the rubber packing member continuously contacting with the circulating water and the through-hole formed on the bottom surface of the lower water tank, thereby causing the circulating water to be polluted in the lower water tank.

Additionally, the water pipe just depends upon only the rotary force of the impeller, and since it sucks the circulating water stored in the lower water tank and feeds it to the upper water tank, it needs a lot of power, thereby making the circulation efficiency of the circulating water undesirably decreased.

DISCLOSURE OF INVENTION

Technical Problem

Accordingly, the present invention has been made in view of the above-mentioned problems occurring in the prior art, and it is an object of the present invention to provide a separately washable rice germination apparatus that has a body of a motor as a power source needed to circulate water and an impeller and an impeller cap rotatably coupled to a shaft of the motor in such a manner as to be easily coupled detachably to each other by means of a magnet, and that secures the coupled motor, the impeller and the impeller cap to the bottom surface of a water tank, together with a water pipe, during the circulation of water according to the rotation of the impeller, such that the coupled motor, the impeller and the impeller cap are secured rigidly during the rotation of the impeller to perform the feeding of the circulating water and are separated easily from each other to wash, thereby achieving more perfect washing.

It is another object of the present invention to provide a separately washable rice germination apparatus that has a motor disposed on the outside of a lower water tank so as to provide power needed for circulating the circulating water stored in the lower water tank and an impeller disposed in the inside of the lower water tank and rotated by receiving the rotary force of the motor, the motor and the impeller are connected to each other through the bottom surface of the lower water tank being closed in a magnetic levitation manner by means of magnetic forces generated from each other, such that the leakage of water generated when the motor is attached through the through-hole formed on the bottom surface of the lower water tank can be prevented.

It is yet another object of the present invention to provide a separately washable rice germination apparatus that separates a section where circulating water is sucked by the rotation of an impeller from a section where the sucked circulating water is pushed upwardly to a germination container and interconnects the two separated sections by means of a bent water pipe, such that the pollution of impeller vanes can be greatly reduced.

It is still another object of the present invention to provide a separately washable rice germination apparatus that has a circulating water guide formed at one side of an impeller-coupling part on which an impeller is seated in the interior of the closed lower water tank so as to support a bent water pipe and guide the advancing direction of the sucked circulating water to an upper water tank in such a manner as to firmly support the inner periphery of an induction pipe, thereby achieving the separating and assembling easily, and that allows the water above a suction port to be swirled in the rotating direction of the impeller according to the suction of the circulating water to the suction port, such that the introduction of air into the center portion of the swirls as well as the decrease in the quantity of circulating water sucked are prevent, thereby improving the circulation efficiency of the circulating water.

Technical Solution

To achieve the above objects, according to the present invention, there is provided a separately washable rice germination apparatus including: a germination container for storing rice to be germinated therein and receiving circulating water; a water tank disposed below the germination container so as to supply the circulating water to the germination container; a bent water pipe disposed at the inside of the water tank so as to feed the circulating water to the germination container; and a power unit having an impeller disposed below the bent water pipe in the interior of the water tank so as to allow the circulating water to be supplied to the germination container therethrough and a motor disposed at the outside of the water tank and detachably coupled to the impeller by means of a magnet so as to provide power rotating the impeller.

According to the present invention, further, the water tank includes an upper water tank adapted to supply the circulating water to the germination container and having a bent water pipe-coupling hole formed on the bottom surface thereof and a lower water tank adapted to store the circulating water therein and having an impeller-coupling part protruded upwardly from the center portion of the bottom surface thereof; the bent water pipe press-fitted above the impeller-coupling part on which the impeller is seated and extended from the bottom surface of the lower water tank to the bent water pipe-coupling hole of the upper water tank so as to supply the circulating water to the upper water tank; and the power unit is configured in a magnetic levitation manner to provide a motor part having a motor disposed on the outside of the underside of the lower water tank so as to provide a rotary force and a magnetic force transmitter having a magnet rotatably connected to a rotary shaft of the motor and an impeller disposed on the inside bottom surface of the lower water tank and connected to the magnetic force transmitter by means of a magnetic force through the bottom surface of the closed lower water tank in such a manner as to be rotated together with the magnetic force transmitter.

According to the present invention, further, the bent water pipe includes: a suction pipe disposed above the impeller in such a manner as to house the impeller therein and having a hole formed on one side periphery thereof so as to feed the sucked circulating water to an induction pipe; and the induction pipe connected along the upper periphery thereof to the bent water pipe-coupling hole and supportedly abutting against the circulating water guide at one surface of the inner lower periphery thereof so as to receive the circulating water through the hole of the suction pipe, and the bent water pipe further includes an air introduction prevention plate adapted to cover the suction pipe in such a manner as to be fixedly disposed along one side periphery of the induction pipe, while being spaced apart from the suction pipe.

Advantageous Effects

According to the present invention, further, there is provided the separately washable rice germination apparatus that separates a section where circulating water is sucked by the rotation of the impeller from a section where the sucked circulating water is pushed upwardly to the germination container, thereby remarkably decreasing the pollution of the impeller, and that couples the motor body as a power source circulating the circulating water between the germination container and the water tank to the impeller and the impeller cap rotated and coupled to the shaft of the motor in such a manner as to be easily separable from each other by means of a magnet, and that secures the coupled motor, the impeller and the impeller cap to the inside bottom surface of the water tank and to the underside thereof, together with the bent water pipe, such that the coupled motor, the impeller and the impeller cap are secured rigidly during the rotation of the impeller to feed the circulating water and are separated easily to wash, thereby obtaining the germinated brown rice in more sanitary and clean state.

According to the separately washable rice germination apparatus, moreover, the motor and the impeller are spaced apart from each other by a predetermined distance above and below the closed lower water tank, such that the power unit is provided in a magnetic levitation manner, thereby preventing the leakage of the circulating water through the connected portion between the motor and the impeller and easily performing the washing.

According to the present invention, furthermore, the bent water pipe is rigidly coupled to the lower water tank by means of the pressure of the circulating water, while being supported by means of the circulating water guide, and when the circulating water above the suction port is swirled and sucked in the rotating direction of the impeller, such that the introduction of air into the center portion of the swirls as well as the decrease in the quantity of circulating water sucked are prevent, and circulating water gently guide upwardly the advancing direction of the circulating water to the curved surface of the circulating water guide to improve the feeding efficiency of the circulating water to the upper water tank.

BRIEF DESCRIPTION OF THE DRAWINGS

FIG. 1 is a separate perspective view showing a rice germination apparatus having a power unit washed separably therefrom according to a first embodiment of the present invention.

FIG. 2 is a sectional view showing the coupled state of the power unit in the separately washable rice germination apparatus according to the first embodiment of the present invention.

FIG. 3 is a sectional view showing a rice germination apparatus having a power unit washed separably therefrom according to a second embodiment of the present invention.

FIG. 4 is a sectional view showing a lower water tank having an impeller-coupling part formed therein in the separately washable rice germination apparatus according to the second embodiment of the present invention.

FIG. 5 is a sectional view showing the lower water tank having the magnetic levitation type power unit coupled thereto in the separately washable rice germination apparatus according to the second embodiment of the present invention.

FIG. 6 is a sectional view showing a bent water pipe coupled to the impeller-coupling part in the separately washable rice germination apparatus according to the second embodiment of the present invention.

FIG. 7 is a perspective view showing the bent water pipe according to the present invention.

FIG. 8 is a partly enlarged view showing the suction pipe according to the present invention.

MODE FOR THE INVENTION

Hereinafter, an explanation on a separately washable rice germination apparatus according to preferred embodiments of the present invention will be discussed with reference to the attached drawings.

First, according to a first embodiment of the present invention, the separately washable rice germination apparatus has a through-hole formed on a lower water tank and has an impeller disposed at the inside of the lower water tank and a motor disposed at the outside of the lower water tank in such a manner as to be detachably coupled to each other by means of a magnet through the through-hole. Next, according to a second embodiment of the present invention, the separately washable rice germination apparatus has no through-hole formed on the bottom surface of the lower water tank and has the impeller disposed at the inside of the lower water tank and the motor disposed at the outside of the lower water tank in such a manner as to be connected to each other in a magnetic levitation manner.

FIG. 1 is a separate perspective view showing a rice germination apparatus having a power unit washed separately therefrom according to a first embodiment of the present invention, and FIG. 2 is a sectional view showing the coupled state of the power unit in the separately washable rice germination apparatus according to the first embodiment of the present invention.

Referring to FIG. 1, there is provided a separately washable rice germination apparatus 100 including: a germination container 200 for storing rice to be germinated therein and receiving circulating water; a water tank 400 disposed below the germination container 200 so as to store the circulating water to be supplied to the germination container 200 therein; a bent water pipe 500 disposed at the inside of the water tank 400 and adapted to interconnect the germination container 200 and the bottom surface of the water tank 400 so as to feed the circulating water to the germination container 200; and a power unit 600 disposed below the bent water pipe 500 so as to provide power needed to circulate the circulating water.

The germination container 200 stores the rice or brown rice to be germinated and is configured to have a water supply hole and a water discharge hole formed on the lower lateral portion or the bottom surface thereof. Desirably, the germination container 200 is configured to a net shape such that the circulating water is easily supplied to and discharged from the stored rice or brown rice. Alternatively, the germination container 200 may be configured to have a double structure where a net is housed inside a container. The germination container 200 desirably includes a cover mounted on the top portion thereof so as to prevent the rice or the brown rice from escaping therefrom.

The water tank 400 stores the circulating water that should be continuously supplied for the germination of the brown rice and is disposed below the germination container 200 with a predetermined quantity of water contained therein so as to collect the circulating water discharged from the germination container 200 again. Also, the water tank 400 has a plurality of locking projections 430 extended inwardly by a predetermined length from the inner lateral periphery of the upper portion thereof so as to support the germination container 200 thereagainst, and the water tank 400 has a through-hole 450 formed on the bottom surface thereof in such a manner as to be coupled to the bent water pipe 500. At this time, the water tank 400 is opened on the top portion thereof such that the germination container 200 is seated on the locking projections 430 and the circulating water is collected again in the water tank 400, and the water tank 400 has discharge means like a drain formed on the bottom surface thereof such that the circulating water is discharged therefrom.

Further, the water tank may be a single tank, and as suggested in Korean Patent No. 675405 issued to the present applicant, it is configured to have a double tank structure wherein an upper water tank supplies water to the brown rice stored in the net-like germination container and a lower water tank supplies the circulating water and collects the circulating water supplied to the brown rice thereinto again.

Like this, if the water tank has the double tank structure, a bent water tank-coupling hole 310 is formed on the bottom surface of the upper water tank so as to supply the circulating water from the lower water tank to the upper water tank, and the upper water tank has coupling means like projections adapted to be coupled to the lower water tank and has a locking projection formed along the inner lateral periphery thereof so as to support the germination container 200 thereagainst.

The bent water pipe 500 has a hollow pipe structure such that the circulating water stored in the water tank 400 is induced to the germination container 200 and is disposed inside the water tank 400 in such a manner as to be coupled along the upper periphery thereof to the bent water pipe-coupling hole 310 and to be coupled on the lower periphery thereof to the through-hole 450.

At this time, the bent water pipe 500 and the through-hole 450 are of course coupled to each other through a variety of coupling means. That is, a predetermined coupling groove is formed along the inner periphery of the through-hole, and a protruding stopper is formed along the lower outer periphery of the bent water pipe 500 in such a manner as to correspond with the coupling groove, such that the protruding stopper is press-fitted to the coupling groove. In order to perform a washing operation, the stopper and the coupling groove are separable from each other. Also, the through-hole 450 desirably has a rubber packing member 440 formed along the inner periphery thereof so as to prevent the leakage of the circulating water when the bent water pipe 500 is coupled to the through-hole 450.

So as to separate a section where circulating water stored in the water tank 400 is sucked from a section where the sucked circulating water is pushed upwardly to the germination container 200 or the upper water tank, the bent water pipe 500 includes a suction pipe 510 having a suction port to which the circulating water stored in the lower water tank is introduced by the suction force generated from the rotation of the impeller vanes as the impeller cap covering the top portion of the impeller 620; and an induction pipe 530 formed on one side of the suction pipe 510 in such a manner as to be extended upwardly to the bent water pipe-coupling hole 310. Thus, the bent water pipe 500 is bent to have an approximately "L"-like shape.

At this time, the induction pipe 530 is extended to the top periphery of the bent water pipe-coupling hole 310. Further, the induction pipe 530 desirably has a somewhat smaller diameter than the inner diameter of the bent water pipe-coupling hole 310 so as to be separably coupled easily to the bent water pipe-coupling hole 310.

Moreover, the induction pipe 530 desirably has a supporting projection step 531 protruded to a bracket shape from the upper outer periphery thereof so as to support the germination container 200 or the upper water tank thereagainst. At this time, while the supporting projection step 531 is abutting against the outer periphery of the underside of the germination container 200 or the upper water tank, it supports the germination container 200 or the upper water tank. Thus, even when the induction pipe 530 is loosely coupled to the bent water pipe-coupling hole, the water pressure at the time of the water supply becomes weak such that the circulating water does not leak downwardly.

Desirably, further, the suction pipe 510 is low in height and large in internal width so as to increase the quantity of sucked circulating water, and desirably, the induction pipe 530 is high in height and small in internal width so as to increase the advancing force of the circulating water fed by the suction force of the suction pipe 510. Thus, desirably, since the through-hole 450 is formed by connecting a relatively large coupling hole into which the lower periphery of the suction pipe 510 is coupled and a relatively small coupling hole into which the lower periphery of the induction pipe 530 is coupled, the through-hole 450 is of a rough snowman-like shape.

The power unit 600, which is separably coupled below the bent water pipe 500 so as to provide power causing the circulating water to be sucked and introduced to the germination container 200, includes an impeller 620 detachably coupled to a motor 610, the motor 610 providing the power rotating the impeller 620, and an impeller-mounting part 630 adapted to detachably mount the impeller 620 and impeller cap to a body of the motor 610 by means of a magnet. At this time, the impeller 620 is disposed in the interior of the water tank 400 and the motor 610 is disposed at the outside of the water tank 400 in such a manner as to be coupled to each other through the through-hole 450 by means of the magnet of the impeller-mounting part 630.

As shown in FIG. 2, the impeller-mounting part 630 is adapted to attach the rotary shaft of the impeller 620 to one surface of the shaft of the motor 610 by means of the magnet such that the suction pipe 510 constituting the cover of the impeller 620 is coupled by means of the magnet to the motor body disposed at the outside of the water tank 400. The power unit 600 which is detachably coupled to the water tank 400 by means of the magnet is coupled to the bent water pipe 500 by means of the through-hole 450 formed on the bottom surface of the water tank 400, and the suction pipe 510 constituting the cover of the impeller 620 is submerged into the water to suck the circulating water thereto, such that a stable coupling force between the power unit 600 and the bent water pipe 500 is maintained to supply the circulating water to the germination container 200, without any strong bolt coupling structure between the impeller and the motor used as a unitary body in the conventional practice. That is, during the supply of the circulating water, the coupling force between the power unit 600 and the bent water pipe 500 is rigid by the generation of the magnetic force therefrom, the pressure of the circulating water, and the coupling through the through-hole, and if it is desired to wash them, they are easily separated from each other by the application of an external force exceeding the magnetic force.

Next, the separately washable rice germination apparatus according to the second embodiment of the present invention wherein the impeller disposed inside the lower water tank and the motor disposed outside the lower water tank are operated in a magnetic levitation manner, without having any through-hole on the lower water tank, will be described with reference to FIGS. 3 to 8.

FIG. 3 is a sectional view showing a rice germination apparatus having a power unit washed separably therefrom according to a second embodiment of the present invention.

Referring to FIG. 3, there is provided a separately washable rice germination apparatus 1000 including: a germination container 1200 for storing rice to be germinated therein; a water tank for storing circulating water to be supplied to the germination container 1200; a bent water pipe 1500 adapted to feed the circulating water stored in the water tank to the germination container 1200; and a power unit 1600 adapted to supply and circulate the circulating water to the water tank through the bent water pipe 1500.

The germination container 1200 is configured to have a bowl or net shape in the same manner as in the first embodiment of the present invention.

The water tank stores the circulating water therein and includes an upper water tank 1300 adapted to supply the water directly to the germination container 1200 and a lower water tank 1400 disposed below the upper water tank 1300 so as to store the circulating water supplied to the upper water tank 1300 therein again. If the water tank is of a shape of a single body, the bent water pipe-coupling hole is formed on the bottom surface of the germination container 1200 and an impeller-coupling part as will be described below is formed on the bottom portion of the water tank.

At this time, the outer peripheral surface of the upper water tank 1300 and the inner peripheral surface of the lower water tank 1400, that is, the extended line to the inner peripheral surface of the lower water tank 1400 are spaced apart from each other by a predetermined distance, such that after the water supplied to the upper water tank 1300 is fed to the germination container 1200, it flows along the outer periphery of the upper water tank 1300 and gathers to the lower water tank 1400. Thus, desirably, the lower water tank 1400 has a locking projection 1430 extended inwardly from the top inner periphery thereof to a predetermined length, so as to support the upper water tank 1300 thereagainst. In other words, the upper water tank 1300 is housed inside the lower water tank 1400 in such a manner as to be supported by means of the locking projection 1430 thereagainst, and also, the upper water tank 1300 is placed along the top periphery of the lower water tank 1400 in such a manner as to be supported along the lower periphery thereof by means of the locking projection 1430.

The upper water tank 1300 has a bent water pipe-coupling hole 1310 formed on the bottom surface thereof in such a manner as to be coupled to the top periphery of the bent water pipe 1500 supplying the circulating water stored in the lower water tank 1400, and further has a water distribution part 1320 disposed on the top side of the bent water pipe-coupling hole 1310 so as to broadly distribute the circulating water supplied from the bent water pipe 1500.

FIG. 4 is a sectional view showing the lower water tank closed on the bottom surface thereof in the separately washable rice germination apparatus according to the second embodiment of the present invention. Referring to FIG. 4, the lower water tank 1400 is closed on the bottom surface thereof and has the impeller-coupling part 1410 protruded upwardly to a predetermined height from the center portion of the bottom surface thereof. At this time, the lower water tank 1400 has a drain device formed on the bottom surface thereof so as to drain the circulating water therethrough and has a predetermined space formed below the underside thereof so as to house the drain device and the motor therein. In this case, the closing state on the bottom surface of the lower water tank 1400 does not mean that the lower water tank 1400 is not completely closed, but means that the lower water tank 1400 does not have any through-hole adapted to be coupled to the power unit 1600. Therefore, the lower water tank 1400 of course has a drain hole adapted to be coupled to the drain device.

The impeller-coupling part 1410 is adapted to seat the impeller 1620 of the magnetic levitation type power unit 1600 thereon and includes a supporting projection step 1411 formed on the bottom surface of the lower water tank 1400 so as to support the lower portion of the impeller 1620 and a fixing shaft 1412 extended by a predetermined length from the top portion of the supporting projection step 1411 in such a manner as to fix the rotary shaft of the impeller 1620 thereon. The fixing shaft 1412 is fitted to the rotary shaft formed at the center portion of the impeller 1620, such that the impeller 1620 is stably coupled to the impeller-coupling part 1410.

The lower water tank 1400 has a depressed space formed by a predetermined depth from the outside of the underside thereof at a position corresponding to the impeller-coupling part 1410 protruded from the inside bottom surface thereof, so as to house a magnetic force transmitter 1612 of the motor 1610 as will be explained below therein. The magnetic force transmitter 1612 is connected by means of a magnetic force to an impeller magnet 1621 disposed at the lower portion of the impeller 1620 through the bottom surface of the lower water tank 1400, so as to transmit the rotary force of the motor 1610 to the impeller 1620.

Also, the impeller-coupling part 1410 has a circulating water guide 1420 extended to a predetermined height from one side thereof. At this time, the circulating water guide 1420 desirably has linear or curved one surface having a predetermined inclination so as to gently guide the advancing direction of the sucked circulating water to the upper water tank 1300. Further, the circulating water guide 1420 has the other surface formed correspondingly to the inner peripheral surface of an induction pipe 1530 of the bent water pipe 1500. As a result, the bent water pipe 1500 is rigidly coupled to the impeller-coupling part 1410.

The rest of the outer peripheries of the impeller-coupling part 1410 excepting the circulating water guide 1420 is protruded lower than the circulating water guide 1420 but a little higher than the impeller-coupling part 1410, such that the inner peripheries of the induction pipe 1530 and the suction pipe 1510 of the bent water pipe 1500 can be firmly coupled supportedly to the lower water tank 1400. Alternatively, the impeller 1620 fitted to the fixing shaft 1412 supports against the outer periphery thereof the inner periphery of the suction pipe 1510 of the bent water pipe 1500 for the rigid coupling between the bent water pipe 1500 and the lower water tank 1400.

At this time, the bent water pipe 1500 is coupled to the lower water tank 1400 after the impeller 1620 is seated on the impeller-coupling part 1410, and if the circulating water is not stored in the lower water tank 1400, the coupling becomes loose. However, if the circulating water is filled in the lower water tank 1400, the pressure from the circulating water is applied to the outer periphery of the bent water pipe 1500, and the circulating water guide 1420 supports the inner periphery of the bent water pipe 1500, thereby achieving a rigid coupling state between the bent water pipe 1500 and the lower water tank 1400. Therefore, only if the impeller 1620 is fitted to the impeller-coupling part 1410 and the circulating water is filled in the lower water tank 1400, a strong coupling effect is obtained like the impeller cap screw-coupled in the existing apparatus. Further, if the circulating water is drained for washing, the water pressure applied to the outer periphery of the bent water pipe 1500 is removed, thereby easily performing the separation and washing.

FIG. 5 is a sectional view showing the lower water tank having the magnetic levitation type power unit coupled thereto in the separately washable rice germination apparatus according to the second embodiment of the present invention, and FIG. 6 is a sectional view showing the bent water pipe coupled to the impeller-coupling part in the separately washable rice germination apparatus according to the second embodiment of the present invention.

Referring to FIGS. 5 and 6, the magnetic levitation type power unit 1600 includes a motor part disposed below the lower water tank 1400 so as to provide a rotary force by which the circulating water is supplied to the upper water tank 1300 and the impeller 1620 adapted to be rotated by the rotary force generated from the motor part. The impeller 1620 is coupled to the bent water pipe 1500 serving as a passageway through which the circulating water is moved to the upper water tank 1300 thereabove.

The motor part is disposed below the lower water tank 1400 and includes a motor 1610 generating the rotary force and a magnetic force transmitter 1612 made of a magnet and rotatably connected to the rotary shaft of the motor 1610 by means of the rotary force generated from the motor 1610. At this time, the magnetic force transmitter 1612 is desirably housed below the impeller-coupling part 1410 in such a manner as to be spaced apart by a predetermined distance from the underside of the lower water tank 1400 so as to prevent the lower water tank 1400 from being damaged during the rotation thereof. Also, the position of the magnetic force transmitter 1612 is adjusted by upwardly and downwardly moving the motor 1610 fixedly connected to the side periphery of the lower water tank 1400.

The impeller 1620 includes an impeller magnet 1621 connected through the bottom surface of the lower water tank 1400 to the magnetic force transmitter 1612 by means of the magnetic force, a rotary shaft rotated together with the impeller magnet 1621, and impeller vanes 1622 connected to the rotary shaft of the impeller 1620 and rotated together with the impeller 1620.

The impeller magnet 1621 is seated on the impeller-coupling part 1410 of the lower water tank 1400 and is desirably broadly formed in proportion with the area of the impeller-coupling part 1410 so as to increase the area connected to the magnetic force transmitter 1612 by means of the magnetic force thereof. At this time, the supporting projection step 1411 of the impeller-coupling part 1410 is desirably made of a dielectric material so as to be easily coupled to the impeller magnet 1621 and rotate it.

The rotary shaft of the impeller 1620 is connected to the impeller magnet 1621 in such a manner as to be rotated together with the impeller magnet 1621 upon the rotation of the impeller magnet 1621, and it is press-fitted along the center portion thereof to the fixing shaft 1412 formed on the impeller-coupling part 1410, thereby preventing the deviation from the impeller-coupling part 1410.

Thus, the motor 1610 disposed below the lower water tank 1400 transmits the rotary force to the magnetic force transmitter 1612 through the motor rotary shaft 1611, and the magnetic force transmitter 1612 transmits the rotary force to the impeller magnet 1621 connected thereto through the bottom surface of the lower water tank 1400 by the magnetic forces generated from each other. That is, if the magnetic force transmitter 1612 is rotated, the impeller magnet 1621 coupled through the bottom surface of the lower water tank 1400 to the magnetic force transmitter 1612 is rotated in the same direction as the magnetic force transmitter 1612, such that the impeller rotary shaft and the impeller vanes 1622 connected to the impeller magnet 1621 are rotated all together to generate the rotary force sucking the circulating water.

At this time, in order to prevent the lower water tank 1400 from being damaged by the rotation of the impeller magnet 1621, preferably, the lower periphery of the impeller magnet 1621 is seated on the top periphery of the supporting projection step 1411 in such a manner as to be spaced apart from the bottom surface of the lower water tank 1400.

Also, the magnetic force transmitter 1612 and the impeller magnet 1621 have the same polarities as each other to have a repulsive force against each other in such a manner as to be spaced apart from the bottom surface of the lower water tank 1400. Alternatively, the magnetic force transmitter 1612 and the impeller magnet 1621 have the different polarities from each other. That is, if the magnetic force transmitter 1612 has an N polarity, the impeller magnet 1621 has an S polarity, and to the contrary, if the magnetic force transmitter 1612 has the S polarity, the impeller magnet 1621 has the N polarity. Thus, they have an attractive force to each other in such a manner as to be connected to each other by means of the magnetic forces, such that as the magnetic force transmitter 1612 is rotated, the impeller magnet 1621 is rotated together with the magnetic force transmitter 1612. Like this, in case where the magnetic force transmitter 1612 and the impeller magnet 1621 are coupled to each other with the different polarities from each other, the impeller magnet 1621 is spaced apart by a predetermined distance from the bottom surface of the lower water tank 1400 by means of the supporting projection step 1411 formed on the bottom surface of the lower water tank 1400, and the magnetic force transmitter 1612 is disposed outside the lower water tank 1400 in such a manner as to be spaced apart by a predetermined distance from the underside of the lower water tank 1400 by the upward and downward adjustment of the height thereof, such that the rotary force of the magnetic force transmitter 1612 is transmitted to the impeller magnet 1621 by the magnetic forces generated from each other, without any formation of the through-hole on the lower water tank 1400, and the damage of the lower water tank 1400 caused during the transmission of the rotary force is prevented.

FIG. 7 is a perspective view showing the bent water pipe according to the present invention. Referring to FIG. 7, in order to separate a section where the circulating water stored in the lower water tank 1400 is sucked from a section where the sucked circulating water is pushed toward the upper water tank 1300, the bent water pipe 1500 includes a suction pipe 1510 disposed above the impeller 1620 so as to suck the circulating water thereto, an induction pipe 1530 disposed on one side periphery of the suction pipe 1510 so as to feed the circulating water to the upper water tank 1300, and an air introduction prevention plate 1540 disposed above the suction pipe 1510 so as to increase the suction force of the suction pipe 1510.

At this time, the suction pipe 1510 is disposed above the impeller 1620 and the induction pipe 1530 abuts against the circulating water guide 1420 along the inner side periphery thereof, thereby allowing the bent water pipe 1500 to be coupled above the impeller-coupling part 1410. At this time, the inner side periphery of the induction pipe 1530 is supported by the other surface of the circulating water guide 1420, thereby achieving the firm coupling of the bent water pipe 1500.

The suction pipe 1510 is disposed above the impeller 1620 seated on the impeller-coupling part 1410 in such a manner as to house the impeller 1620 therein, and the suction pipe 1510 has a hole formed on one side thereof so as to supply the sucked circulating water to the induction pipe 1530. Thus, as the circulating water filled in the suction pipe 1510 is rotated by the rotation of the impeller 1620, a centrifugal force is applied to the inner side periphery of the suction pipe 1510. Through the centrifugal force, the circulating water is rotated while flowing along the wall periphery of the suction pipe 1510 and is gently fed to the induction pipe 1530 through the hole formed on one side of the suction pipe 1510.

Also, the suction pipe 1510 has a suction port 1520 formed on the top surface thereof so as to suck the circulating water stored in the lower water tank 1400 by means of the rotary force of the impeller 1620. The suction port 1520 has a smaller diameter than the suction pipe 1510 and has a center shaft 1521 formed at the center thereof and a plurality of partitions 1522 extended from the center shaft 1521 to the inner peripheral surface thereof. At this time, the partitions 1522 are fixed to the center shaft 1521 and the inner peripheral surface of the suction port 1520 such that the inner space of the suction port 1520 is divided into a plurality of sections. The suction port 1520 is desirably submerged into the circulating water stored in the lower water tank 1400 so as to prevent the air inside the lower water tank 1400 from being sucked thereto by the rotary force of the impeller 1620, thereby improving the feeding efficiency of the circulating water. This helps the pressure inside the impeller 1620 constantly maintained.

Further, the air introduction prevention plate 1540 has a relatively large width in such a manner as to be spaced apart by a predetermined distance from the suction port 1520 and it is fixedly coupled to the induction pipe 1530 along one side periphery thereof. At this time, the air introduction prevention plate 1540 has such a width as to cover the suction port 1520, and as the circulating water is sucked to the suction port 1520, the circulating water above the suction port 1520 is swirled in the rotating direction of the impeller 1620 by means of the rotary force of the impeller 1620, such that the swirling becomes strong to introduce the air to the center thereof, thereby preventing the quantity of circulating water sucked from being decreased.

In other words, the air introduction prevention plate 1540 prevents the rotary force of the impeller 1620 from being continuously applied just above the suction port 1520, such that the air inside the lower water tank 1400 is not sucked and the rotary force of the impeller 1620 is applied over a relatively large area around the suction port 1520, thereby preventing the quantity of circulating water sucked to the suction port 1520 from being decreased. As the air introduction from the suction port 1520 having the opened top portion thereof to the center of the swirls is prevented, the reduction of the quantity of circulating water sucked is avoided to improve the circulation efficiency of the circulating water.

The induction pipe 1530 has a predetermined length capable of connecting the bottom surface of the lower water tank 1400 and the bent water pipe-coupling hole 1310 formed on the upper water tank 1300 and receives the circulating water from the suction pipe 1510 through the hole formed on one side periphery of the suction pipe 1510. Also, the induction pipe 1530 desirably has a supporting projection step 1531 formed protrudedly from the upper outer periphery thereof so as to support the underside periphery of the upper water tank 1530 thereagainst. At this time, the inner one side periphery of the induction pipe 1530 abuts against one surface of the circulating water guide 1420 formed on the impeller-coupling part 1410, such that the induction pipe 1530 is rigidly coupled between the upper water tank 1300 and the lower water tank 1400.

Thus, the circulating water introduced to the induction pipe 1530 through the hole of the suction pipe 1510 from the inner peripheral surface of the suction pipe 1510 by the centrifugal force flows along the linear or curved type one surface of the circulating water guide 1420 to the upper water tank 1300 and naturally advances to the upper water tank 1300 in a lengthwise direction of the induction pipe 1530. Therefore, the circulating water is supplied to the upper water tank 1300 with a substantially smaller rotary force than that supplied to the upper water tank only by means of the rotary force of the impeller.

Next, an explanation on the operation of the separately washable rice germination apparatus having the power unit having the impeller and the motor mounted in a magnetic levitation manner according to the second embodiment of the present invention will be given.

First, the impeller 1620 is seated on the impeller-coupling part 1410 protruded inwardly from the bottom surface of the lower water tank 1400, and the bent water pipe 1500 is coupled above the impeller 1620. At this time, the impeller magnet 1621 formed on the lower portion of the impeller 1620 is supported by means of the supporting projection step 1411 formed on the impeller-coupling part 1410 in such a manner as to be spaced apart by the predetermined distance from the bottom surface of the lower water tank 1400. Next, the rotary shaft of the impeller is fitted to the fixing shaft 1412 formed on the top portion of the supporting projection step 1411, thereby performing positioning the impeller 1620.

The suction pipe 1510 of the bent water pipe 1500 is disposed above the impeller 1620, and the induction pipe 1530 is supported along the inner periphery thereof against one surface the circulating water guide 1420 formed on one side of the impeller-coupling part 1410. If the circulating water does not exist, the bent water pipe 1500 becomes loose in the coupling state. However, if the circulating water is filled, the bent water pipe 1500 has the pressure of the circulating water applied to the outer periphery thereof and is supported by the circulating water guide 1420 against the inner periphery thereof, thereby allowing the coupling to be in a rigid state. After that, if the circulating water is all drained for washing, the pressure of the circulating water is removed from the outer periphery of the bent water pipe 1500, such that the bent water pipe 1500, the lower water tank 1400, and the impeller 1620 are easily cleaned.

Next, the motor disposed below the lower water tank 1400 is adjusted to the position in such a manner as to place the magnetic force transmitter 1612 just below the impeller magnet 1621. At this time, the magnetic force transmitter 1612 is adjusted to the height in such a manner as to be spaced apart by a predetermined distance from the underside of the lower water tank 1400. Thus, the magnetic force of the magnetic force transmitter 1612 is passed through the spaced distance from the lower water tank 1400 and the lower water tank 1400 and is then transmitted to the impeller magnet 1621 having the repulsive force against the magnetic force transmitter 1612 having the same polarities as the impeller magnet 1621 and, otherwise, to the impeller magnet 1621 having the attractive force to the magnetic force transmitter 1612 having the different polarities from the impeller magnet 1621. The impeller magnet 1621 is rotated together with the magnetic force transmitter 1612 by means of the magnetic force transmitted from the magnetic force transmitter 1612 connected to the rotary shaft 1611 of the motor 1610. Therefore, while the magnetic force transmitter 1612 is being spaced apart from the impeller magnet 1621, the repulsive force against each other or the attractive force to each other is generated to transmit the rotary force of the motor 1610 to the impeller 1620, such that even though no separate through-hole for connecting the impeller 1620 and the motor 1610 is formed on the lower water tank 1400, the power is transmitted to move the circulating water. At this time, the magnetic coupling between the impeller 1620 and the motor 1610 may be of course made before the coupling of the bent water pipe 1500.

At this time, after the magnet coupling between the impeller 1620 and the motor 1610 is finished, the circulating water is filled in the lower water tank 1400. At this time, the circulating water is desirably filled to make the upper portion of the air introduction prevention plate 1540 sufficiently submerged thereinto, thereby improving the circulation efficiency of the circulating water.

After that, if power is applied to the motor 1610 to rotate the motor 1610, the magnetic force transmitter 1612 connected to the rotary shaft 1611 of the motor 1610 is rotated together with the motor 1610. Thus, the impeller magnet 1621 coupled to the magnet force transmitter 1612 in such a manner as to be spaced apart by the predetermined distance therefrom is rotated, and the rotary shaft 1622 and the impeller vanes 1623 connected to the impeller magnet 1621 are all rotated.

The circulating water contained in the suction pipe 1510 is rotated by the rotation of the impeller vanes 1623, while having the centrifugal force applied to the inner peripheral surface of the suction pipe 1510. The circulating water rotated along the inner peripheral surface of the suction pipe 1510 by the centrifugal force is fed through the hole formed on the suction pipe 1510 and is gently induced along the inclined surface of the circulating water guide 1420 to the upper side thereof, thereby being supplied to the upper water tank 1300.

The circulating water existing in the suction port 1520 is sucked to the suction pipe 1510 by the rotation inside the suction pipe 1510, and the circulating water existing above the suction port 1520 is sucked again to the suction port 1520 by the suction force of the suction pipe 1510. At this time, the circulating water sucked by means of the partitions 1522 of the suction port 1520 is sucked through the divided four sections and is rotated along the inner peripheral surface of the suction pipe 1510 by means of the rotary force generated from the upper portion of the suction port 1520.

At this time, as the circulating water is sucked to the suction port 1520, the circulating water existing above the air introduction prevention plate 1540 spaced apart by the predetermined distance from the suction port 1520 is swirled in the rotary direction thereof by the rotary force of the impeller 1620, and as the swirls become strong, the introduction of air into the center of the swirls as well as the decrease in the quantity of circulating water sucked are prevented. Thus, the upward transmission of the rotary force of the circulating water sucked to the suction port 1510 is prevented to widely distribute the circulating water around the suction port 1510, which prevents air from being sucked above the suction port 1510 to the center of the swirls, thereby allowing a large quantity of circulating water to be introduced to the suction pipe 1510. The circulating water introduced to the suction pipe 1510 is rotated along the inner periphery of the suction pipe 1510 by the centrifugal force generated inside the suction pipe 1510 and is fed to the induction pipe 1530, thereby improving the circulation efficiency of the circulating water.

As described above, according to the separately washable rice germination apparatus of this invention, the motor disposed at the outside of the lower water tank containing the circulating water therein transmits the power to the impeller disposed inside the lower water tank, such that since no separate through-hole connecting the motor and the impeller is formed on the lower water tank, the motor and the impeller are disposed in the magnetic levitation manner in such a manner as to have an attractive or repulsive force to or against each other, which allows the rotary shaft of the impeller to be rotated by the rotation of the motor, thereby preventing the leakage of the circulating water through the connected portion between the motor and the impeller.

Additionally, since there is no through-hole for connecting the impeller and the motor, there occur some advantages in that the pollution caused by the foreign substances adhered to the connected portion therebetween can be prevented; the impeller and the motor can be easily separated and repaired or exchanged when they do not work; and the bottom surface of the lower water tank and the lower portion of the impeller can be easily cleaned.

Furthermore, the suction of air to the center of the swirls generated upon the suction of the circulating water above the suction port can be prevented, and the rotary force caused by the rotation of the impeller and the centrifugal force inside the suction pipe are maximized to improve the sucking efficiency of the circulating water. Also, the circulating water is gently guided upwardly along the inclined surface of the circulating water guide in the advancing direction thereof, thereby improving the supplying efficiency of the circulating water to the upper water tank.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A separately washable rice germination apparatus comprising:
   a germination container adapted to store rice to be germinated therein and receive circulating water;
   a water tank disposed below the germination container so as to supply the circulating water to the germination container;
   a bent water pipe disposed at the inside of the water tank so as to feed the circulating water to the germination container; and
   a power unit having an impeller disposed below the bent water pipe in the interior of the water tank so as to allow the circulating water to be supplied to the germination container therethrough and a motor disposed at the outside of the water tank and detachably coupled to the impeller by means of a magnet so as to provide power rotating the impeller,
   wherein the water tank comprises an upper water tank having a bent water pipe-coupling hole formed thereon to supply the circulating water to the germination container and a lower water tank adapted to store the circulating water therein and having an impeller-coupling part protruded upwardly from the center portion of the bottom surface thereof,
   wherein the bent water pipe is press-fitted an upper portion of the impeller-coupling part on which the impeller is seated and is extended from the bottom surface of the lower water tank to the bent water pipe-coupling hole of the upper water tank so as to supply the circulating water to the upper water tank, and wherein the power unit is configured in a magnetic levitation manner to provide a motor part having the motor disposed on the outside of the underside of the lower water tank so as to provide a rotary force and a magnetic force transmitter having a magnet rotatably connected to a rotary shaft of the motor, and the impeller disposed on the inside bottom surface of the lower water tank and connected to the magnetic force transmitter by means of a magnetic force through the bottom surface of the closed lower water tank so as to be rotated together with the magnetic force transmitter,
   wherein the magnetic force transmitter is spaced apart from the underside of the lower water tank, so as to prevent a direct contact with the lower water tank during the rotation thereof
   wherein the impeller comprises:
      an impeller magnet having a different polarity from that of the magnetic force transmitter to generate an attractive force against the magnetic force transmitter and adapted to be seated on the impeller-coupling part in such a manner as to be spaced apart by a predetermined distance from the bottom surface of the lower water tank;
      a rotary shaft rotatably connected to the impeller magnet; and
      a plurality of impeller vanes rotatably connected to the rotary shaft of the impeller, and
   wherein the impeller-coupling part comprises a supporting projection step formed on the bottom surface of the lower water tank so as to support the lower portion of the impeller magnet in such a manner as to allow the impeller magnet to be spaced apart by the predetermined distance from the bottom surface of the lower water tank, and a fixing shaft extended by a predetermined length from the top portion of the supporting projection step in such a manner as to fix the rotary shaft of the impeller thereon.

2. The separately washable rice germination apparatus as defined in claim 1, wherein the distance between the magnetic force transmitter and the lower water tank is adjusted by upwardly and downwardly moving the motor disposed below the lower water tank.

3. The separately washable rice germination apparatus as defined in claim 1, wherein the impeller-coupling part has a circulating water guide extended to a predetermined height from one side thereof, the circulating water guide having a linear or curved one surface having a predetermined inclination so as to gently guide the advancing direction of the circulating water sucked to the bent water pipe to the upper water tank and the other surface extended downwardly therefrom so as to support the inner periphery of the induction pipe of the bent water pipe, such that the bent water pipe is supported along the inner periphery thereof by means of the circulating water guide and is supported along the outer periphery thereof by means of the pressure of the circulating water contained in the lower water tank, thereby being rigidly coupled to the impeller-coupling part.

4. The separately washable rice germination apparatus as defined in claim 3, wherein the bent water pipe comprises: a suction pipe disposed above the impeller in such a manner as to house the impeller therein and having a hole formed on one side periphery thereof so as to allow the sucked circulating water to be fed to an induction pipe therethrough; and the induction pipe connected along the upper periphery thereof to the bent water pipe-coupling hole and supportedly abutting against the circulating water guide on one surface of the inner lower periphery thereof so as to receive the circulating water through the hole of the suction pipe therethrough.

5. The separately washable rice germination apparatus as defined in claim 4, wherein the bent water pipe further comprises an air introduction prevention plate adapted to cover the top side of the suction pipe in such a manner as to be fixedly disposed along one side periphery of the induction pipe, while being spaced apart from the suction pipe.

6. The separately washable rice germination apparatus as defined in claim 4, wherein the suction pipe comprises a suction port formed on the top portion thereof so as to suck the circulating water contained in the lower water tank thereto, a center shaft formed at the center of the suction port, and a plurality of partitions extended from the center shaft to the inner peripheral surface of the suction port.

\* \* \* \* \*